ERROR DETECTING AND CORRECTING SYSTEM

Filed Jan. 11, 1950 3 Sheets-Sheet 1

INVENTORS R. W. HAMMING
B. D. HOLBROOK

BY

J W Schmied

ATTORNEY

May 15, 1951 R. W. HAMMING ET AL 2,552,629

ERROR DETECTING AND CORRECTING SYSTEM

Filed Jan. 11, 1950 3 Sheets-Sheet 2

INVENTORS R. W. HAMMING
B. D. HOLBROOK
BY
J W Schmied
ATTORNEY

May 15, 1951 R. W. HAMMING ET AL 2,552,629

ERROR DETECTING AND CORRECTING SYSTEM

Filed Jan. 11, 1950 3 Sheets-Sheet 3

INVENTORS R. W. HAMMING
B. D. HOLBROOK

BY J. W. Schmied

ATTORNEY

Patented May 15, 1951 2,552,629

UNITED STATES PATENT OFFICE 2,552,629

ERROR-DETECTING AND CORRECTING SYSTEM

Richard W. Hamming, Morristown, and Bernard D. Holbrook, Madison, N. J., assignors to Bell Telephone Laboratories, Incorporated, New York, N. Y., a corporation of New York Application January 11, 1950, Serial No. 138,016

20 Claims. (Cl. 177—353)

This invention relates to permutation code systems and in particular to apparatus for and a method of detecting and correcting errors which impair the accuracy of the output information of such systems.

The invention may be exemplified in its practical application chiefly in systems employing binary permutation codes. That is, systems in which a code group consists of a numerical sequence of any number of 0's or 1's in any permutation arrangement. Any individual element of such a code, therefore, consists of a 0 or 1. In the telegraphic art such code permutation groups are referred to as consisting of marking and spacing elements. These marking and spacing elements may be differentiated from each other in practical arrangements by conditions of current and no current, positive current and negative current, or by any other suitably selected pairs of conditions. It is more or less customary for workers in the telegraphic and related arts to use the expression "code combination" rather than the expression "code permutation" in reference to a code group. It should, therefore, be understood that the word "permutation" is used herein as being more accurate but should not be taken to distinguish from the terminology of code combination as used by telegraphers and others when applicable.

The prior art offers systems and methods of checking the accuracy of received or recorded permutation codes. In one known type of system there are added to the standard five-unit permutation code groups two additional elements for the purpose of checking accuracy. In such systems the permutations usable for information may consist of those having, for example, exactly four marking elements per code group of seven elements transmitted; and in such arrangements the receipt of a permutation or code group having less or more than four marking elements indicates some kind of error. Moreover, the principle involved in thus checking the accuracy of encoded received information may be extended to codes consisting of a greater number of elements. There are in use systems employing so-called two-out-of-five codes. Upon analysis, these are found to be five-element binary permutation code systems in which but ten of the possible permutations are used, these being ten in which there are exactly two marking (or spacing) elements. Arrangements have been devised whereby a single error in the receipt or recordation of a code group of such a system is detected in that such an error results in more or less than two marking or spacing conditions as the case may be. The principles of this type of checking and error indication may be extended to codes of greater than five units. Indeed, it may be shown upon analysis that error checking in the two-out-of-five systems and error checking in the four-out-of-seven systems involve similar principles.

Furthermore, in certain types of arrangements there have been used so-called biquinary systems wherein analogous methods have been employed whereby recording or reception in such a system may be accomplished with the indication of a single error.

All of these arrangements involve the limiting feature that an error upon being introduced, although detected, is not automatically corrected. The maximum result which the method or apparatus can achieve is indication of the presence of the error. This indication is accomplished in various ways, for example, by printing in the case of printing telegraphy, an auditory alarm signal indicating that an error has occurred, by stopping the reception and sending back to the transmitting end of the system a signal indicating the necessity of retransmitting some portion of the information over again or, in the case of certain types of systems, causing the operation to cease until the erroneous condition is detected and corrected by human intervention.

In accordance with the present invention, the art may be advanced to a point where an actual error or errors of transmission or recording may be corrected automatically. Furthermore, in addition to correcting one or more such errors, code systems designed in accordance with the principles of the invention may simultaneously incorporate error correction if a first number of errors occurs and error detection if a second number of errors occurs. In its simplest aspect, the invention may consist of means for correcting a single error; in a further advanced aspect it may provide means for correcting one error or detecting two errors; in a more advanced aspect it can provide means for correcting two errors, etc. However, practical considerations such as those of cost and complexity may place a limit upon the extent to which error correction and detection is to be carried in any particular case. Thus, it will be seen from an analysis of the description of the invention which follows hereafter that the complexity thereof, both in theory and practice, increases rapidly as one provides for the correction and/or detection of additional errors in a code wherein the information bearing elements consist of a definite number. However, under no set of circumstances is it possible for any system using the principles of this invention to correct code groups if every element comprising said code groups is transmitted erroneously.

One advantage of the invention is that it may be employed to correct an error of transmission or recording in lieu of a prior type of system in which hitherto an error has merely been indicated. Thus, for example, consider the operation of a computer. In such a case the usual result of an error is to cause the computing to cease until the apparatus is attended to correct the error inducing condition. In the case of a computer left to run overnight without attendance, operation would cease until morning upon the occurrence of a single error. By employing apparatus involving the principles of the present invention, a single error or a succession of single errors in sequentially transmitted code groups can be corrected without system shutdown for repairs. By employing the principles of the invention in a more extensive form a machine could be made to stop upon the occurence of a double error.

Furthermore, there are numerous types of transmission systems such as binary permutation computers and pulse code modulation telephony systems wherein the automatic correction of an error is of great value; because, in general, in these systems it is either impractical to stop the operation or impossible to do so effectively if the end and aim of the system is to be achieved. In the case of telephone transmission, the difficulties of stopping transmission at the reception of an erroneous code group are quite apparent. The present invention therefore lends itself to advantageous application in such arrangements.

Another distinctive feature of utility wherein the present invention advances the art is the capability of systems constructed in accordance with the principles of the invention to correct data which has been erroneously stored. Thus, for example, a given system may store information in the form of a record, for example, perforated tape. Certain errors in such tape may be corrected long after the original source of information has ceased to operate by the error correcting procedures disclosed herein.

As mentioned hereinbefore, systems in accordance with this invention take on increasing degrees of complexity as compared to ordinary binary permutation code systems or binary permutation code systems in which error detection only is provided. By way of exemplary embodiment, there is described hereinafter a system in accordance with the invention whereby use is made of electromagnetic relays for registering permutation codes and correcting errors. Broadly, however, the principles of the invention may be applied to other types of systems involving such devices as vacuum tubes, gaseous tubes, cathode-ray tubes or mechanical arrangements.

As in the case of most advances in the art for providing greater accuracy, the present advance may be accomplished only by the addition and use of equipment over and above that necessary for transmission or recording without the use of the invention. In general, it will be seen from the first method of analysis presented hereinafter that one embodiment of the invention requires the addition of check elements to the permutation code information elements, these additional elements are generated at the sending or originating end, at which point means are provided for controlling the proper nature of these check elements to accompany any particular code group. At the receiving end there is provided additonal register means to register not only the information elements of the code but also the check elements added for correction purposes, together with parity circuits or means for checking subgroups of the registered elements of the code groups together with a relay tree for determining the location within a code group of an error which occurs, and finally means for reversing the erroneous electrical condition which comprises the error.

A detailed analysis of the self-detecting and correcting codes used in this invention is necessary for full understanding of the practical structural analogies disclosed. The binary representation of 0 or 1 is used throughout the specification to represent code group elements for mathematical convenience and also because this method is the natural form for representing the open and closed relays, absence or presence of pulses, perforated tapes, cards with holes or nonholes, and dot and dash methods that are used in many forms of code information systems.

The error-detecting and correcting codes disclosed may be constructed from code groups containing a total of $n$ elements in a sequence; of this total, using one method of analysis, $m$ particular elements are associated with the information, and $n-m=k$ elements are used for error check elements. The error correction is accomplished by grouping with the necessary information elements the additional check elements whose binary values 0 or 1 are generated in accordance with certain rules. The function of the check elements is to detect, locate and correct errors appearing in any element, $k$ as well as $m$, of a code group.

In any binary code using $n$ element code groups, $2^n$ different permutations are possible, and $2^n$ significant meanings could be assigned to the different code groups. But in the self-correcting and other codes of this invention, $2^m$ different permutations are used to convey information throughout a given system. $2^n-2^m$ of the $2^n$ possible different permutations represent code groups with single element errors. This allocation of possible code groups to information and erroneous meanings produces a redundancy R defined as the ratio of the number of elements used to the minimum number necessary to convey the same information, that is, $R=n/m$. This serves to measure the efficiency of the code as far as the transmission of information is concerned.

A single error-detecting code is a code in which sufficient check elements are sent with each code group so that a single error in any code group can be detected; a single error-correcting code sends enough additional check elements with each code group so that a single error in any code group can be detected, located and corrected.

Similar definitions apply to multiple error-detecting and correcting codes.

In the following subsections, methods of constructing special minimum redundancy binary codes in the following cases are shown:

I*a*. Single error-detecting codes (known in the prior art).

I*b*. Single error-correcting codes (not known in the prior art).

I*c*. Single error-correcting plus double error-detecting codes (not known in the prior art).

Section II of this specification discusses a newly devised geometrical analysis of error-detecting and correcting codes, and Section III contains a detailed explanation of the structural analogies of special codes *b* and *c* of Section I and also extensions to those structures.

SECTION I*a*.—SINGLE ERROR-DETECTING CODES

A single error-detecting code having $n$ binary elements in each code group may be constructed in the following manner. In the first $n-1$ element positions, $n-1$ elements of information appear. In the $n$th position either a 0 or 1 element appears so that the entire $n$ positions have an even number of 1's. This is clearly a single error-detecting code since any single error in transmission would leave an odd number of 1's in a code group.

The redundancy of these codes is:

$$R=\frac{n}{n-1}=1+\frac{1}{n-1}$$

It might appear that to gain the apparent advantages of a low redundancy, $n$ should become very large. However, by increasing $n$ the probability of at least one error in a code group increases due to errors caused by the equipment transmitting the additional elements. The risk of a double error, which would pass undetected, also increases.

The type of detection check used above to determine whether or not the code group has any single error will be used throughout the specification and will be called a parity check. The above was an even parity check; it is obvious, however, that an odd number of 1's could have been used to determine the value of the element of the $n$th position. In such a case the parity check for detecting the presence of an error would have been an odd parity check. Furthermore, a parity check need not always involve all the elements of a code group but may be a check over selected element positions only.

SECTION I*b*.—SINGLE ERROR-CORRECTING CODES

To construct a single error-correcting code, $m$ of the $n$ available element positions in each code group are assigned as information positions. The number $m$ is regarded as fixed and is determined by the maximum number of code group means needed to convey information, but the specific element positions to be occupied in the code group by the $m$ information elements are left to later determination. Next, the $k=n-m$ remaining element positions are assigned as check positions, that is, the binary values in these positions, 0 or 1, are to be determined by even parity checks in conjunction with element values appearing in certain selected information positions to be determined by Table II.

For a given number of information elements $m$, the minimum number of check elements to be assigned to each code group is fixed. Sufficient check elements must be included, however, so that any single error may be detected, located and corrected. If the code group was received correctly, the check elements should also be able to indicate correct reception of the code group. Since it is required that the $k$ check elements show the position of a single error in an $n$ element code group plus a correct code group, if such is received, the check elements must be able to describe $m+k+1=n+1$ different conditions. Therefore, with a binary representation code $k$ elements can indicate $2^k$ possible conditions, thus $$2^k \geqq m+k+1 \text{ or } 2^k \geqq n+1$$

is a condition on $k$.

Using this inequality, Table I is calculated which gives the maximum $m$ for a given $n$ or, what is the same thing, the minimum $n$ for a given $m$.

*Table I*

| $n$ | $m$ | Mimimum $k$ |
|---|---|---|
| 1 | 0 | 1 |
| 2 | 0 | 2 |
| 3 | 1 | 2 |
| 4 | 1 | 3 |
| 5 | 2 | 3 |
| 6 | 3 | 3 |
| 7 | 4 | 3 |
| 8 | 4 | 4 |
| 9 | 5 | 4 |
| 10 | 6 | 4 |
| 11 | 7 | 4 |
| 12 | 8 | 4 |
| 13 | 9 | 4 |
| 14 | 10 | 4 |
| 15 | 11 | 4 |
| 16 | 11 | 5 |

To use Table I in constructing an error-correcting code the requirements of the information system which will use the code must be known. If, for example, sixteen different code group meanings are necessary for proper system operation, the condition is specified that $2^m=16$ in the binary code representation. The number of information elements or $m$, therefore, equals 4. The seventh row of Table I shows three check elements are necesary and as indicated in the table $n$ must be 7.

Having determined the general requirements of a code group for a particular system, the binary value 0 or 1 involved in the necessary check elements must be determined so that code group correction is possible, or if no correction is necessary such a condition is described by the check elements. The first step in accomplishing this essential objective is to assign each check element a value determined by a parity check of selected information elements. In an arbitrary code group representation, throughout this specification, the check element positions in an also arbitrary choice appear to the left of the information element positions. The numerical assignment of the various element positions in an element position sequence is as follows:

$$k_1, k_2, k_3 \ldots k_{n-m}, m_1, m_2, m_3 \ldots m_m$$

The positions for a $n=7$ code would be:

$$k_1, k_2, k_3, m_1, m_2, m_3, m_4$$

The respective element positions from left to right are for convenience in certain cases also given a numerical notation of 1, 2, 3, 4, 5, 6, 7, etc., which is called a code group position sequence.

One method of constructing a complete parity check procedure for a single-error correcting code is embodied in the following two rules:

1. Each of the elements of $n=m+k$ positions of a code group must be in parity check subgroup with one or more of the check elements. In other words each element must be in a parity arrangement with at least one check element. An element may also have a parity association with a plurality of check elements.

2. It is both necessary and sufficient that no two different elements have exactly the same set of checks associated with them.

An example of parity construction following these rules is shown in Table II.

*Table II*

| Check Number | Check Element Position | Code Group Position | | | | | | |
|---|---|---|---|---|---|---|---|---|
| | | 1 | 2 | 3 | 4 | 5 | 6 | 7 |
| 1 | $k_1$ | $x$ | | | $x$ | $x$ | | $x$ |
| 2 | $k_2$ | | $x$ | | $x$ | | $x$ | $x$ |
| 3 | $k_3$ | | | $x$ | | $x$ | $x$ | $x$ |

This table is limited to three check element positions; therefore, from Table I only $n=7$ element positions can be checked. The particular positions to be assigned to check elements and information elements is not material. Upon examination of Table II it will be found that rules 1 and 2 for constructing correcting parity checks are satisfied. Each code group position is covered by at least one check element and also each code group position is covered by a different combination of check elements. For example, code group position 1 has the check set $k_1$, code group position 2 has the check set $k_2$, code group position 3 has the check set $k_3$, code group position 4 has the check set $(k_1, k_2)$, etc.

The necessity for rule 2 is based on the following reasoning. Suppose two different element positions had associated with themselves the same check element sets. Then an error in either one of the two positions would produce the same set of check element failures determined by a parity count, therefore a pattern of parity check failures would provide no means for determining which of the two element positions was in error. If code group parity checks are so constructed that each element position has a unique set of checks associated with itself and with no other element position then the pattern of parity check failures will indicate exactly what element position is in error as a unique set of parity check failures will occur for an error in each of the different element positions.

As an illustration of the above theory, a seven-position code is constructed. From Table I if $n=7$, then $m=4$ and $k=3$. From Table II, the first check in position $k_1$ involves code group positions 1, 4, 5, 7 and the second check in position $k_2$ involves code group positions 2, 4, 6, 7 and the third check in position $k_3$ involves code group positions 3, 5, 6, 7. This leaves positions 4, 5, 6, 7 as information positions. The result, after writing down all possible binary numbers using positions $m_1$, $m_2$, $m_3$, $m_4$ and calculating the values in the check positions $k_1$, $k_2$, $k_3$ by an even parity method over the selected positions of Table II, is Table III.

*Table III*

| Code Group Position | | | | | | | Numerical Value of Code Group |
|---|---|---|---|---|---|---|---|
| 1 | 2 | 3 | 4 | 5 | 6 | 7 | |
| Element Position | | | | | | | |
| $k_1$ | $k_2$ | $k_3$ | $m_1$ | $m_2$ | $m_3$ | $m_4$ | |
| 0 | 0 | 0 | 0 | 0 | 0 | 0 | 0 |
| 1 | 1 | 1 | 0 | 0 | 0 | 1 | 1 |
| 0 | 1 | 1 | 0 | 0 | 1 | 0 | 2 |
| 1 | 0 | 0 | 0 | 0 | 1 | 1 | 3 |
| 1 | 0 | 1 | 0 | 1 | 0 | 0 | 4 |
| 0 | 1 | 0 | 0 | 1 | 0 | 1 | 5 |
| 1 | 1 | 0 | 0 | 1 | 1 | 0 | 6 |
| 0 | 0 | 1 | 0 | 1 | 1 | 1 | 7 |
| 1 | 1 | 0 | 1 | 0 | 0 | 0 | 8 |
| 0 | 0 | 1 | 1 | 0 | 0 | 1 | 9 |
| 1 | 0 | 1 | 1 | 0 | 1 | 0 | 10 |
| 0 | 1 | 0 | 1 | 0 | 1 | 1 | 11 |
| 0 | 1 | 1 | 1 | 1 | 0 | 0 | 12 |
| 1 | 0 | 0 | 1 | 1 | 0 | 1 | 13 |
| 0 | 0 | 0 | 1 | 1 | 1 | 0 | 14 |
| 1 | 1 | 1 | 1 | 1 | 1 | 1 | 15 |

Thus a seven-position single error-correcting code admits of sixteen code groups. There are, of course, $2^7-16=112$ meaningless or single error code groups. In some applications it may be desirable to drop the first code group from the code to avoid the all zero combination as either a code group or a code group plus a single error since this might be confused with no message. This would still leave 15 useful code groups. The column in Table III, "Numerical value of code group," represents arbitrary meanings assigned to the code groups of Table III.

Thus far the code theory presented deals with error-correction code group construction. In order to understand the theory of error location and correction additional explanation follows: To locate a particular element position whose value has been received in error, reception parity checks must be made over the same selected positions used in initially determining the values of the check elements. If a correct parity is received over the selected positions for each check a 0 is arbitrarily written down. If an error occurs and an even parity group is received with an odd number of 1's, a 1 is written down. After this procedure is accomplished for all of the checks associated with a code group, a sequence of 0's indicates that the code group was received free from any single error. A sequence with a 1 in it indicates an error. Because of the uniqueness by which the parity checks of Table II were constructed, any given reception parity check permutation of 0's and 1's having at least a single 1 in the sequence will indicate the element position of a single element error.

To illustrate this procedure, let it be assumed that the code group representing decimal value 1, i. e., 1110001, is transmitted. Furthermore, let it be supposed that the transmitted code group was received with a single error in element position $k_1$ so that the code group appears as 0110001. From Table II, the check element in position $k_1$ or code group position 1 involves code group positions 1, 4, 5 and 7. The check element in position $k_2$ or code group position 2 involves code group positions 2, 4, 6 and 7. The check element in position $k_3$ or code group position 3 involves code group positions 3, 5, 6 and 7. Check 1 involving the code group positions of check element $k_1$ totals 1, an odd number, which indicates an error because check 1 was transmitted in accordance with even parity, so a 1 is written in the parity check sequence. Check 2 involving the code group positions of check element $k_2$ totals 2, an even number, so no error exists in this check; therefore, 0 is written in the parity check sequence. Check 3 totals 2, an even number also, so no error exists. Another 0 is written in the parity check sequence. If the 0's and 1's are written from right to left as they were calculated, the reception parity check notation 001 results, which, because of the method by which the parity checks were determined, indicates an error in code group position 1 or what is the same thing, element position $k_1$. To correct the located error, the opposite value need only be inserted in element position $k_1$. By going through similar procedures errors in any code group element can be located by the binary sequence resulting from the reception parity check and the 0 and 1 substitution procedures outlined above. For if the parity checks are constructed in accordance with the two rules given, a different and unique 0 and 1 reception parity check sequence will occur for element errors in different element positions. Table IV shows the reception parity check sequence values for correct and incorrect transmission of the code groups of Table III if a 0 is written for a correctly received parity subgroup and a 1 is written for an incorrectly received parity subgroup.

*Table IV*

| Error Position | Parity subgroup | | |
|---|---|---|---|
| | $k_3$ | $k_2$ | $k_1$ |
| $k_1$ | 0 | 0 | 1 |
| $k_2$ | 0 | 1 | 0 |
| $k_3$ | 1 | 0 | 0 |
| $m_1$ | 0 | 1 | 1 |
| $m_2$ | 1 | 0 | 1 |
| $m_3$ | 1 | 1 | 0 |
| $m_4$ | 1 | 1 | 1 |
| No errors | 0 | 0 | 0 |

SECTION Ic.—SINGLE-ERROR CORRECTING AND DOUBLE-ERROR DETECTING CODES

To construct a single-error correcting plus double-error detecting code one more element position is added to the single-error correcting code groups constructed in Section Ib and shown in Table III. The binary value which appears in the additional position is determined by a parity check procedure involving all of the other elements of a code group similar to the method used in the error detection code of Section Ia. Table V is the result of adding an eighth column between the third and fourth columns of Table III whose element values, 0 or 1, are determined so as to form even parity with the other elements appearing in the appropriate code group.

Code group position 8 appears out of order numerically so that all the check element positions will be together at the left of the information positions. The values appearing in code group position columns 1, 2, 3 are determined by even parity checks over the selected information positions required by Table II. It should be recognized that it is not necessary for the parity check subgroups for any $k_1$, $k_2$, $k_3$ check to include code group position 8 for operation of this code.

*Table V*

| Code Group Position | | | | | | | | Numerical Value of Code Group |
|---|---|---|---|---|---|---|---|---|
| 1 | 2 | 3 | 8 | 4 | 5 | 6 | 7 | |
| Element Position | | | | | | | | |
| $k_1$ | $k_2$ | $k_3$ | $k_4$ | $m_1$ | $m_2$ | $m_3$ | $m_4$ | |
| 0 | 0 | 0 | 0 | 0 | 0 | 0 | 0 | 0 |
| 1 | 1 | 1 | 0 | 0 | 0 | 0 | 1 | 1 |
| 0 | 1 | 1 | 1 | 0 | 0 | 1 | 0 | 2 |
| 1 | 0 | 0 | 1 | 0 | 0 | 1 | 1 | 3 |
| 1 | 0 | 1 | 1 | 0 | 1 | 0 | 0 | 4 |
| 0 | 1 | 0 | 1 | 0 | 1 | 0 | 1 | 5 |
| 1 | 1 | 0 | 0 | 0 | 1 | 1 | 0 | 6 |
| 0 | 0 | 1 | 0 | 0 | 1 | 1 | 1 | 7 |
| 1 | 1 | 0 | 1 | 1 | 0 | 0 | 0 | 8 |
| 0 | 0 | 1 | 1 | 1 | 0 | 0 | 1 | 9 |
| 1 | 0 | 1 | 0 | 1 | 0 | 1 | 0 | 10 |
| 0 | 1 | 0 | 0 | 1 | 0 | 1 | 1 | 11 |
| 0 | 1 | 1 | 0 | 1 | 1 | 0 | 0 | 12 |
| 1 | 0 | 0 | 0 | 1 | 1 | 0 | 1 | 13 |
| 0 | 0 | 0 | 1 | 1 | 1 | 1 | 0 | 14 |
| 1 | 1 | 1 | 1 | 1 | 1 | 1 | 1 | 15 |

The properties of this code are as follows: (1) If there are no errors in a code group all of the checks including the additional check will be satisfied. Again, writing a 0 for a correct parity check and a 1 for an incorrect parity check the proper reception parity check results would be represented as 0000. (2) If there is a single error the added check appearing in code group position 8 will fail, that is, the value in position $k_4$ will not be in even parity with the values appearing in $k_1$, $k_2$, $k_3$, $m_1$, $m_2$, $m_3$ and $m_4$. This is true whether the error is in the information, the original check or the added check. The original checks give the position of the error, where now the 000 value of the original checks means the added check has failed. (3) If there are two errors in the received code group, in all such situations the added check is satisfied because even parity exists. Checks $k_1$, $k_2$, $k_3$ merely indicate some kind of error. There is no pattern which can be made of the error indication in this case so as to locate even one of the errors and then correct it. The usefulness of the code group in this condition merely extends to double-error detection, and it is not possible to correct one of the double errors and to detect the other. An explanation for this characteristic of the code will be described in detail in Section II.

Table VI shows the reception parity check values for correct and incorrect transmission of the code groups of Table VI if a 0 is written for a correctly received parity subgroup and a 1 is written for an incorrectly received parity subgroup.

*Table VI*

| Error Position | Parity Subgroup | | | |
|---|---|---|---|---|
| | $k_4$ | $k_3$ | $k_2$ | $k_1$ |
| $k_1$ | 1 | 0 | 0 | 1 |
| $k_2$ | 1 | 0 | 1 | 0 |
| $k_3$ | 1 | 1 | 0 | 0 |
| $m_1$ | 1 | 0 | 1 | 1 |
| $m_2$ | 1 | 1 | 0 | 1 |
| $m_3$ | 1 | 1 | 1 | 0 |
| $m_4$ | 1 | 1 | 1 | 1 |
| $k_4$ | 1 | 0 | 0 | 0 |
| No errors | 0 | 0 | 0 | 0 |
| Two errors | 0 | ---- | ---- | ---- |

1, 2 or all of $k_1$, $k_2$ and $k_3$ will have a 1 value.

SECTION II—GEOMETRICAL THEORY

In analyzing the characteristics and properties of error detecting and correcting codes it is often desirable to introduce a geometric model. The model described herein is a unit $n$-dimensional cube with $2^n$ vertices. Each vertex of the model is identified with a particular binary code group. Code groups having $n$ elements are used; therefore, $2^n$ different binary permutations are possible and each vertex can be represented by a different code group. A part or subset of the total $2^n$ vertices are assigned code groups which represent information in a particular code. These are called information vertices. The remaining vertices are assigned code groups which represent errors in the same code. It should be remembered that error detection and correction codes have a redundancy greater than 1, which means that all possible different 0 and 1 code group element permutations do not have meanings assigned to them. Each vertex represented by a code group is also given an arbitrary algebraic notation such as $x$, $y$ or $z$ for analytical convenience.

Into this cube of $2^n$ vertices a distance is introduced, or as it is usually called, a metric, which is represented by the notation $D(x, y)$. $D(x, y)$ in the $n$ dimensional model represents the shortest distance between vertex $x$ and vertex $y$. This distance is not necessarily a straight line but is the scalar total of the straight line unit length cube edges between adjacent vertices in completing the shortest path from vertex $x$ to vertex $y$. It is to be noted that in a particular binary code group assignment the information vertices are not necessarily adjacent to each other and that the shortest distance path followed between information vertices will pass over error code group vertices. Also each unit length cube edge over which a path is taken forms a right angle with other unit length cube edges at each vertex. In calculating the distance this angle is not important.

The assignment of binary code groups, error as well as information, to given vertices, is as follows: Code groups which have only one element value differing when a comparison is made to the values appearing in the respective element positions of any arbitrary code group are assigned to vertices only a unit distance from the vertex assigned to the arbitrary code group. Similar definitions apply for multiple distance vertex code groups. For example, in a model where $n=3$, two elements of any code group in the group 001, 010, 100 and 111 differ from the elements of the remaining code groups when a respective comparison of all three element positions is made. The above four code groups may be said to be two unit distances apart in a three-dimensional system. In an $n$-dimensional system, code groups having different values appearing in $g$ element positions after a comparison of respective element positions must be assigned vertices $g$ unit distances apart. For example, if $n$ equals 8, the following three code groups must be assigned vertices four unit distances apart from each other; 00000000, 00001111, 11001100.

In order that the geometrical explanation thus far may be more clearly understood it is adapted to the single-error correcting code groups of Table III. In Table III, 7-element code groups are used; therefore, a 7-dimensional model is used for geometric study. Such a model has $2^7$ vertices. Table III contains only 16 information code groups. Any permutation code group not appearing in Table III is an error. In a 7-element code group $2^7$ permutations of 0 and 1 are possible; therefore, $2^7-16$ equals the number of single-error code groups possible, or 112.

The information code groups are assigned to vertices which have a distance determined by element value comparison of the code groups in Table III. Any given code group of Table III has element values which are different from the element values appearing in the respective element positions of any other code group of Table III in at least three element positions. For example, comparing the code groups representing numerical values 1 and 2, element value differences are noted in element positions $k_1$, $m_3$ and $m_4$; while the $k_2$, $k_3$, $m_1$, and $m_2$ element positions have the same element values in the same element positions of the two code groups.

This difference of element values in three element positions means that the two code groups must be assigned to vertices 3 units of distance apart. Comparison of all the code groups of Table III shows that all the code groups differ from each other in element values appearing in at least three element positions. Therefore, the sixteen code groups are assigned to vertices at least three unit distances apart. The 112 single-error code groups are assigned to the remaining vertices in accordance with a comparison which shows how many unit distances a given error code group should be from the information vertices already assigned to the cube. It will be found that each vertex has a given code group and that the distance requirement is met in assigning the individual binary code groups to the different vertices. However, for certain specified values for $m$, $k$ and $n$ the geometrical cube will not be completely packed with single-error and information code groups for each vertex.

If all the information code group vertices are at a distance of at least two units from each other, then it follows that any single error will represent a vertex that is not associated with information, and hence is an erroneous code group. This in turn means that any single error is detectable. It is not correctable because it is not possible to ascertain from which information code group the error code group resulted as the single error code group is a unit distance from at least two information code groups. When the minimum distances between information vertices is at least three units then any single error will represent a position at a vertex nearer to the correct information vertex than to any other information vertex and this means that any single error will be correctable for in this case it is possible to ascertain by comparison which information code group was received erroneously. This type of information is summarized in the following table for various distance assignments between information vertices.

*Table VII*

| Minimum Distance Between Code Groups | Meaning |
|---|---|
| 1 | uniqueness. |
| 2 | single-error detection. |
| 3 | single-error correction. |
| 4 | single-error correction; double-error detection. |
| 5 | double-error correction. |
| etc. | |

Conversely, it is evident that if we are to effect the detection and correction listed, then all the distances between information vertices must equal or exceed the minimum distance listed. Thus the problem of finding suitable codes for a given system requirement is the same as that of finding subsets of vertices in the geometrical space which maintain at least the minimum distance condition. The special codes discussed in subsections I*a*, I*b*, and I*c* were merely descriptions of one method of selecting a particular subset of points for minimum distances of at least 2, 3 and 4, respectively. For example, any given code group in Table III is at least three units of distance away from any other code group listed. There are many permutation schemes in the mathematical art for accomplishing this result. The reception parity check method disclosed was also just one method of comparing the received code group with all possible transmitted code groups so as to locate and correct errors depending upon the code design.

It should perhaps be noted that at a given minimum distance some of the correctability may be exchanged for more detectability. For example, a code with a minimum distance of 5 may be used for:

(*a*) Double-error correction (with, of course, double-error detection), or (*b*) Single-error correction plus triple-error detection, or (*c*) Quadruple-error detection.

Another feature of proper distance information codes should be observed. In the particular codes constructed in subsections I*a*, I*b* and I*c* any interchanges of columns representing the same element position of all the code groups of the code do not change the code in any essential way. Neither does interchanging the 0's and 1's in any position, a process usually called complementing. This idea is made more precise in the following definition. Two codes are said to be equivalent to each other if by a finite number of the following operations one can be transformed into the other:

1. The interchange of any two positions in the code groups; and

2. The complementing of the values found in all element positions in the code groups.

Thus a study of a class of codes can be reduced to the analysis of typical members of each equivalent class. All discussions in this specification directed to a particular code are applicable in whole to any code in the same equivalence class. In terms of the geometric model, equivalence transformation amounts to rotation and reflections of the unit cube.

A further feature of the codes discussed in subsections I*a*, I*b* and I*c* is that they represent codes which have the minimum redundancy possible to accomplish the assigned detection and correction requirements.

SECTION III—STRUCTURAL ANALOGIES OF SELF-CORRECTING CODES

In order that the hereinbefore described self-correcting codes may be clearly understood and readily incorporated into digital information systems, structural analogies embodying relay circuits will now be fully described with reference to the accompanying drawings in which.

Figure 1:
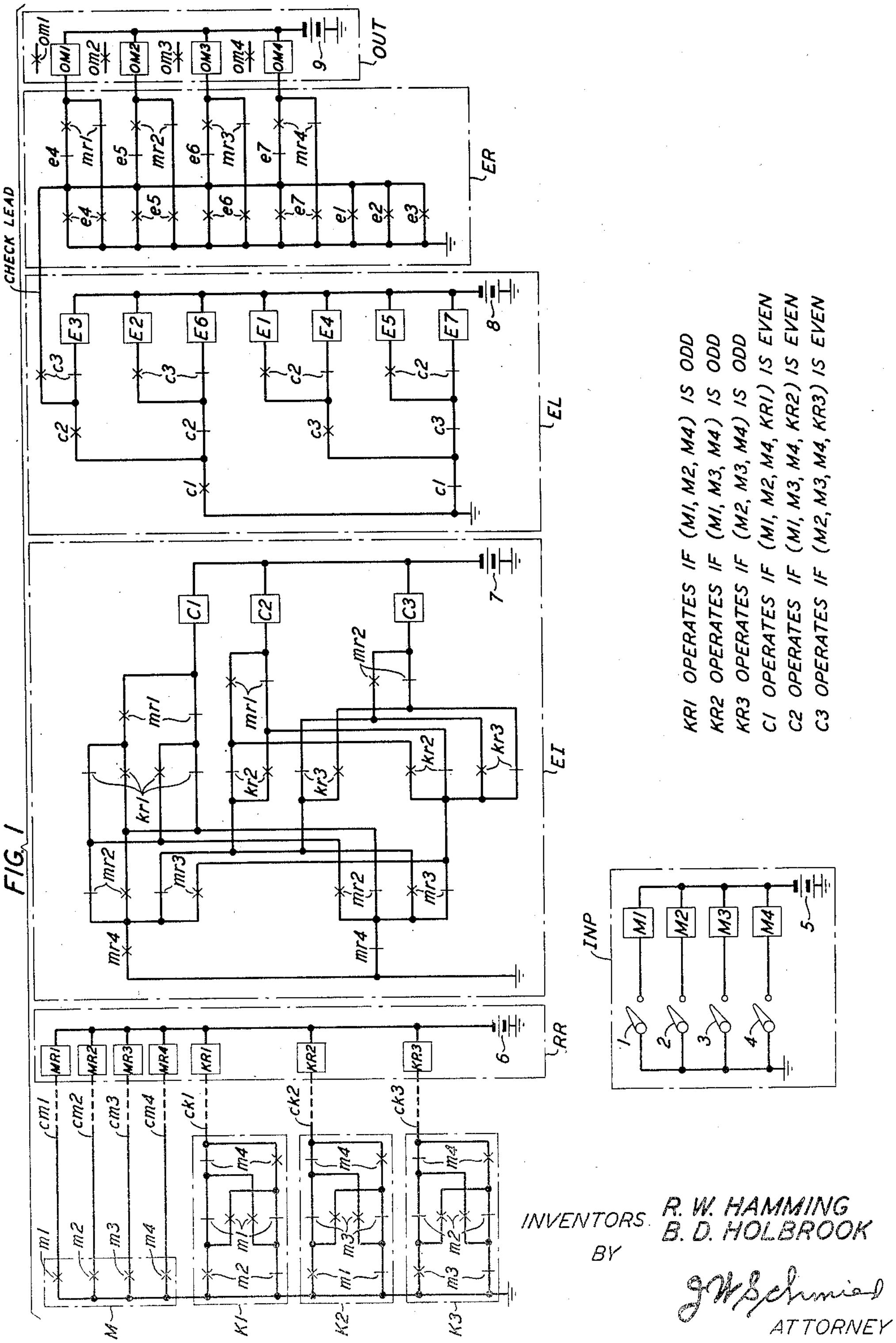
Fig. 1 is a single-error correcting relay circuit employing seven-element code groups.
Figures 2, 3:
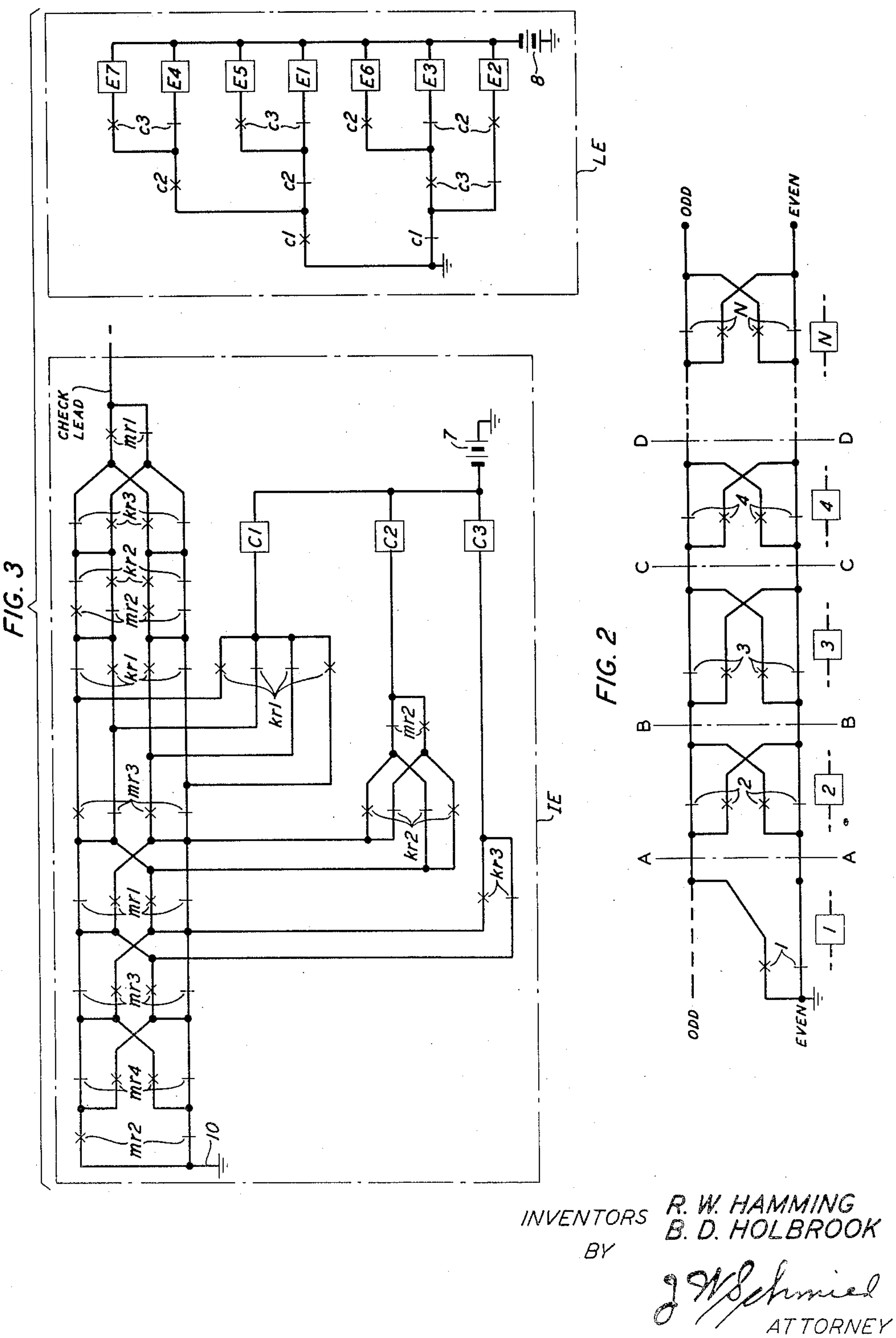
Fig. 2 is a basic parity check relay circuit that can be adapted with slight modifications to particular single-error correcting or multiple-error detecting and correcting code systems having any given length code groups.
Figure 4:
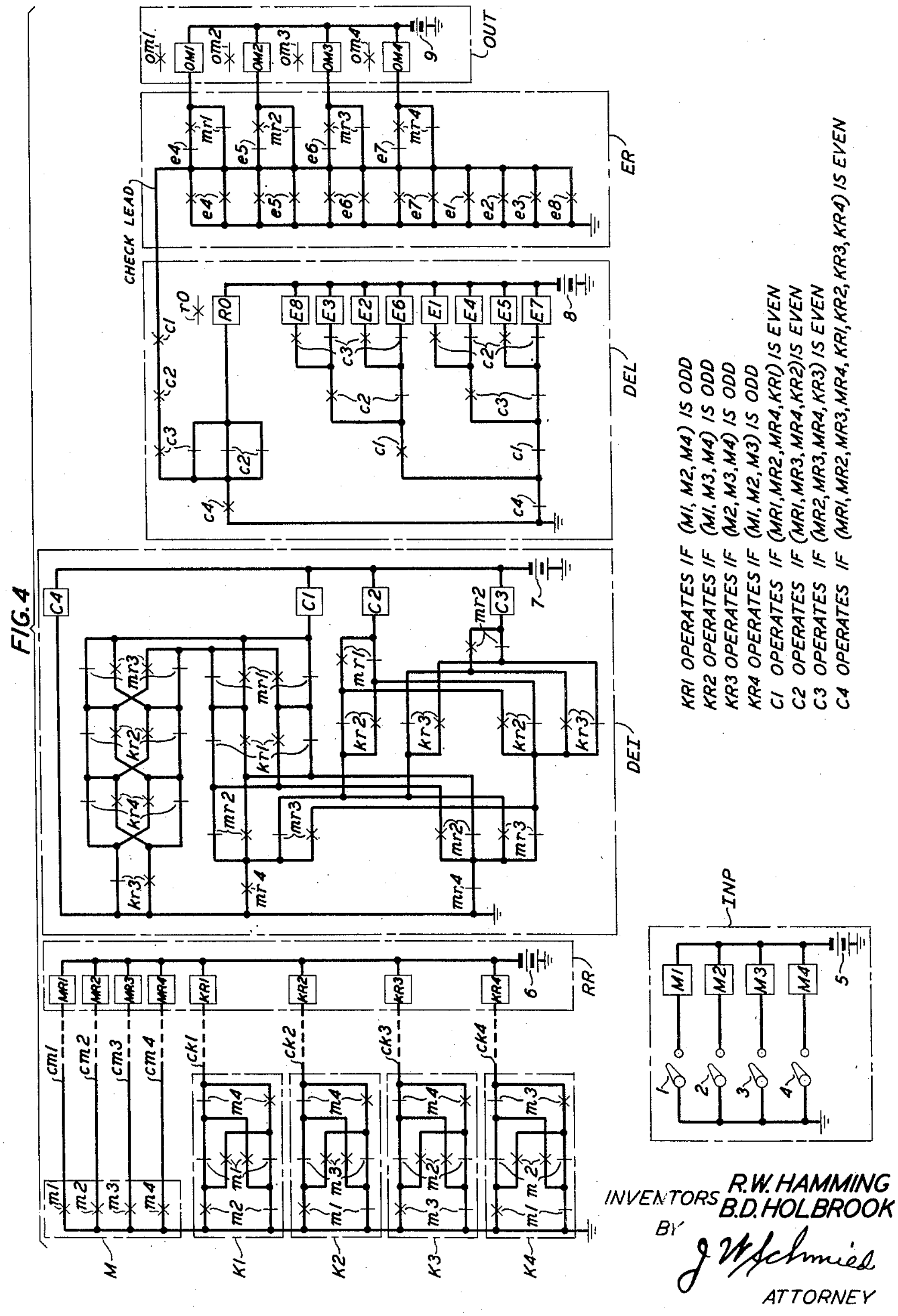

Fig. 3 embodies an alternate receiving parity circuit arrangement for the single-error correcting relay circuit of Fig. 1; and Fig. 4 is a single-error correcting plus double-error detecting relay circuit employing eight-element code groups.

The drawings of the circuits of this invention will be easier to follow if the schematic diagrams do not associate relay contacts with the relay structure which makes or breaks the contacts. The method of relay representation used herein follows in part the drawing analysis described by Claude E. Shannon in "A symbolic analysis of relay and switching circuits" published in the Translations of the American Institute of Electrical Engineers, volume 57, page 713. The schematic symbols employed in accordance with the method of analysis used herein are briefly explained as follows: Each rectangle represents a relay winding and structure, excepting the contacts actuated by that structure. A set of make contacts is shown by two short crossed lines through the joining point of which passes a solid line representing the connecting leads to the set of make contacts. A set of break contacts is shown by a short line, through the midpoint of which passes a solid line representing the connecting leads to the set of break contacts. The capital letter or numeral or combinations thereof within each rectangle identifies a particular relay, and the lower case letter or numeral or combinations thereof adjacent a set of contacts identifies a set of contacts operated by the relay bearing the capital letter and/or numeral designation. Thus a set of contacts drawn

is a make set on relay Q2, one drawn

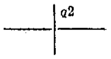

is a break set on the same relay. Other circuit elements are shown in the usual form.

Fig. 1 is constructed from component relay circuits which perform electrical functions analogous to the mathematical steps disclosed in conjunction with the $n=7$, $m=4$, and $k=3$ single-error correcting code of Section I*b*. Where certain component circuits or portions of a circuit in Fig. 1 are assigned a particular function, they are enclosed within a dotted line rectangle for clarification. Throughout the structural descriptions a 1 value in a particular element position will be represented electrically by a current impulse in the channel of the input and output circuits of an error correcting system which transmit and receive that element. A 0 element value in the same code group position will be represented by the absence of current in the same channel circuits. In general, the circuit functions are as follows: Relay circuits within input arrangement INP pick up non-error correcting information code impulses from a digital information source not shown. The relay contacts within M transmit the information impulses to the receiving register relays coils within RR. Simultaneously with the transmission of the information impulses for a given code group over certain or all of the channels *cm*1, *cm*2, *cm*3, and *cm*4, check element impulses are sent over certain or all of check channels *ck*1, *ck*2, and *ck*3. These check element impulses are determined by the relay sending parity circuits within K1, K2, and K3. The register relay coils within RR are thus energized in accordance with the information impulses originally sent by the information source and the additional check impulses determined by K1, K2 and K3. The relay contacts and relay coils within E1 form a receiving parity check circuit for indicating an error in any of the code impulses registered or the erroneous absence of an impulse which should have been registered by the register relay coils within RR. EL is a relay tree which locates the channel position of an error indicated by the circuit components within EI. An error having been indicated by the circuit within EI and located by the circuit within EL, components within ER correct the erroneous channel by sending to the output circuit within OUT an impulse if one is required or removing an impulse if one was erroneously transmitted.

A detailed explanation of the circuit of Fig. 1 is as follows: INP is a switching arrangement operated by a source of digital information not drawn. The code impulses transmitted from the information source are assumed to be in accordance with a non-error correcting code whose code groups contain 4 information elements, therefore, $2^4=16$ possible code groups can be received from the information source. These 16 code groups are identical with the code groups of Table III except they do not include the three additional check elements of the Table III code groups. A part or all of the switches 1, 2, 3 and 4 of INP are closed simultaneously, electrically or mechanically, by the information source depending upon the 1 values in the $m_1$, $m_2$, $m_3$ and $m_4$ element positions, respectively, of a given code group to be converted into an error correcting code group by this invention. The particular relay coils M1, M2, M3 and M4 of INP in series with the set of switches closed by the information source are energized by battery 5. The energized relay coils M1, M2, M3 and M4 operate the relay contacts within rectangles M, K1, K2 and K3. Individual make contacts *m1*, *m2*, *m3* and *m4* within M, when closed by relay coils M1, M2, M3 and M4, provide a ground return path for receiving register relay coils MR1, MR2, MR3 and MR4. The relay contact arrangements within K1, K2 and K3 provide in certain cases a ground return path for receiving register relay coils KR1, KR2 and KR3. Battery 6 energizes certain or all of the register relay coils depending upon which of line channels *cm1*, *cm2*, *cm3*, *cm4*, *ck1*, *ck2* and *ck3* are grounded. There is a receiving register relay and line channel for each of the element positions necessary to transform the code impulses received from the information source to error correcting code impulses. Check element impulses in accordance with the values appearing in positions $k_1$, $k_2$, and $k_3$ of Table III are registered by relay coils KR1, KR2 and KR3, respectively. These registered impulse values are determined by the parity circuit arrangement of the relay contacts within K1, K2 and K3. From subsection I*b* the check element value of element position $k_1$ was determined by an even parity of the values found in $k_1$, $m_1$, $m_2$ and $m_4$ element positions. The check element value of position $k_2$ was determined by an even parity of element positions $k_2$, $m_1$, $m_3$, $m_4$, and the check element value of position $k_3$ was determined by an even parity of element positions $k_3$, $m_2$, $m_3$ and $m_4$. Therefore, the rule for designing the parity circuits of K1, K2 and K3 is simply that if an odd number of relays in the groups (M1, M2, M4), (M1, M3 and M4), or (M2, M3 and M4) is energized by the information source, then the contact connections within K1, K2 and K3 will respectively ground relay coils KR1, KR2 and KR3. The relay coils within RR then form a receiving register for single-error correcting code groups. The impulses which form these code groups are sent over channels *cm1*, *cm2*, *cm3*, *cm4*, *ck1*, *ck2* and *ck3*, which may be long transmission lines which are subject to transient pick-up or grounding; or the channels may operate several stages of an information system not shown and then connect to the register relay coils within RR.

The circuit arrangement within EI shows contact networks operated by the receiving register relay coils within RR, which under certain make and break conditions, ground check relay coils C1, C2 and C3. Each check relay is operated if the corresponding parity subgroup of the register relay coils receives an even number of signals. In particular, relay coil C1 is energized if an even number of register relay coils KR1, MR1, MR2 and MR4 is energized, relay coil C2 is energized if an even number of register relay coils KR2, MR1, MR3 and MR4 is energized; and relay coil C3 is energized if an even number of relay coils KR3, MR2, MR3 and MR4 is energized. If a transmission error occurs and a particular relay coil within RR was not energized or was erroneously energized, 1, 2 or all of C1, C2 and C3 would not be energized thereby indicating an even parity group was received in odd parity and that, therefore, an error occurred in the transmission of a code group over the channels. The particular relays or combinations thereof of C1, C2 and C3 that are not energized identify an error in a particular transmission channel because of the unique method of generating the transmitted check elements by the circuits within K1, K2 and K3 following the scheme of Table II. Thus, in general, the circuit within EI is an error indicating arrangement if an error occurs. If an error does not occur C1, C2 and C3 will be grounded and energized by battery 7. The circuit arrangement within EL includes a network of contacts actuated by relay coils C1, C2 and C3. Depending upon the particular contacts that are made or broken by C1, C2 and C3, one of the error locating relay coils E1, E2, E3, E4, E5, E6 and E7, will be grounded and energized by battery 8 if a single transmission error occurs. The contacts actuated by C1, C2 and C3 are connected into a relay tree; since there are three check relays operating relay transfer contacts there are eight contact outputs to the tree. If one or more of the check relays has not operated, the appropriate error locating relay coil is grounded through the tree, thus making or breaking the relay contacts within ER that are actuated by the energized error locating relay coil.

The error locating relay contacts and the register relay contacts within ER are used for grounding and thereby energizing a combination of the output relay coils within OUT in accordance with the particular receiving register relay coils within RR that are energized with correction for any single error in transmission. Battery 9 supplies the energizing current for the output relay coils. If no error has been detected by check relay C1, C2 and C3, a check ground is received from the contact arrangement with EL, that is make *c1*, make *c2* and make *c3* are closed thereby grounding the check lead shown on the drawing. In this case, because none of the error locating relays is energized and all the break contacts $e_4$, $e_5$, $e_6$ and $e_7$ are closed, the indications of the register relays MR1, MR2, MR3 and MR4 are repeated forward by energizing the appropriate output relays within OUT. This ground return path, which indicates no error, plus the seven ground return paths to the error locating relays make up the eight output connections to the relay tree within EL. If, however, one of the error relays has operated, no check ground can be furnished by the contacts within EL, and the check lead will be grounded through an error relay make contact within ER of the operated error relay. This lead will also be disconnected from the make contact of the corresponding register relay by the break contact of the error relay that was operated. Thus, any of the register relays, whose corresponding error relays are unoperated, will transmit ground forward if the register relays are operated; the register relay whose corresponding error relay has been operated will, however, transmit ground forward only if the register relay is unoperated, thus reversing the indication of the register relay. Contacts *om1*, *om2*, *om3* and *om4* are actuated by the output relays and may be used to operate a tape machine, register or an information system in accordance with the corrected code. It is obvious, however, that other contact arrangements may be actuated by relays OM1, OM2, OM3 and OM4 so as to operate required output devices.

The correct and incorrect transmission of a particular code group throughout the circuit of Fig. 1 is now described. If the numeral 12, 1100 in the binary representation, is received from the information source by the switch arrangement within INP, switches 1 and 2 will be closed and M1 and M2 will be energized by current flow from battery 5. Make contacts *m1* and *m2* within M will be closed by M1 and M2 thereby grounding MR1 and MR2. MR1 and MR2 will, therefore, be energized by battery 6. KR1 will not be grounded by the contact arrangement within K1 for there is no combination of closed contacts therein which provides a path to ground. KR2 will be energized by battery 6 through the ground path provided by K2 using make *m1*, break *m3* and break *m4*. KR3 will be energized by battery 6 through the ground return path provided by K3 using break *m3*, make *m2* and break *m4*. Thus, the information code impulses from the information source are received by the register relay coils within RR in an error correcting code group of 0111100 by grounding register relay coils KR2, KR3, MR1 and MR2. As the code group received by the register relay coils was correct, error indicating relays C1, C2 and C3 within EI are grounded and, therefore, energized by battery 7 through (*mr1* make, *kr1* break, *mr2* make, *mr4* break); (*mr1* make, *kr2* make, *mr3* break, *mr4* break) and (*mr2* make, *kr3* make, *mr3* break, *mr4* break), respectively. When all of relay coils C1, C2 and C3 are grounded, *c1* make, *c2* make and *c3* make within EL are closed thereby grounding the check lead. The make contacts *mr1* and *mr2* within ER, having been closed by register relay coils MR1 and MR2, provide a ground return path for the output relay coils OM1 and OM2 through the closed error break contacts *e4* and *e5* and the grounded check lead. In this instance because the register relay coils were energized correctly, the particular set of output relay coils OM1, OM2, OM3 and OM4 which is to be energized is determined by the corresponding energized register relay coils.

However, as an example of error correction, if erroneous transmission by channel *cm3* were caused by a fault to ground on this conductor, or if make contact *m3* within M due to faulty contact operation were to remain closed from a previous contact operation, receiving register relay MR3 would be energized and numeral 12 would be received as 0111110 with an incorrect element value in element position $m_3$. Check relay C1 would be grounded and thereby energized by battery 7 through *mr1* make, *kr1* break, *mr2* make and *mr4* break. There is, however, no ground path formed by any combination of closed contacts within EI for relays C2 and C3. This failure of relay coils C2 and C3 to be energized indicates an error in a particular channel. The indicated error is located as to element position by the contact arrangement with EL. Make contact *c1* is closed by C1 thereby energizing error relay E6 through make *c1*, break *c2* and break *c3*. This locates the error detected by the C1 energized, C2 unenergized, and C3 unenergized combination as being in element position $m_3$. The check lead is not grounded by contacts within EL. However, a make contact *e6* within ER grounds the check lead so that ground to make *mr1* and make *mr2* completes a closed circuit to OM1 and OM2, respectively. The break contact *e6* within ER actuated by E6 blocks ground to make *mr3* thereby correcting the error transmitted over channel *cm3*. OM1 and OM2 are grounded through (*mr1* make, *e4* break, *e6* make) and (*mr2* make, *e5* break, *e6* make), respectively. As OM4 is not grounded by any contact combination the output code group is corrected and is received as 1100.

By the use of additional contacts on error relay E6 a device may be arranged so as to give an indication that a specific error was received at some point in a particular channel in the sending, transmission and receiving equipment associated therewith thereby assisting the repair man in his search for the defective apparatus.

In a practical application of this circuit an information system will be subject to limited errors due to transmission line defaults or defective operation of particular stages inserted in any information line channel of *cm1*, *cm2*, *cm3*, *cm4*, *ck1*, *ck2*, and *ck3*. In such a case any particular single error will be corrected for.

Any circuit fault within M, K1, K2 and K3, which erroneously energizes or fails to energize any particular one of the seven register relay coils within RR for a given code group, will also be corrected for by the circuit arrangement within EI, EL and ER before the code group reaches the output relay coils within OUT. This is the type of error which is corrected by the circuit of Fig. 1. System errors in the information source and the operation of the circuits within INP will, of course, not be corrected since the check elements have not yet been added.

In a given system more or less than 4 information elements per code group may be required. In such a case modifications of Fig. 1 will, of course, be necessary. Table I indicates the number of check elements that must be added to different length code groups so that they may be converted into error correcting code groups. In general, the circuit changes required in Fig. 1 are as follows: INP must be modified so that there is a switch and coil path for each information element used in the non-error correcting code groups received from the information source. M must be modified so that there is a make contact for each information element channel. There must also be included additional information register relays for each added channel. A table such as Table II must be constructed following the two rules given in subsection Ib for the creation of parity checks for the length of code group required. For each additional check element a parity check circuit such as K1, K2 and K3 is necessary. To each of the partity check circuits there must be assigned the information elements which the check element is to be in parity with as determined by the table drawn up. A given parity check circuit must be designed following the general arrangement of K1 so that when an odd number of the relay coils within INP are energized by the information source with which the check element is to be in parity, a receiving register relay coil will be grounded. If an even number is energized, the receiving register relay coil is not to be grounded. Fig. 2 shows a general parity arrangement which with slight modifications can be adapted to particular circuit requirements. A group of N relays are arranged from left to right and numbered consecutively from 1 to N. Two relay contact levels, marked odd and even on the figure, are shown. Since 0 is an even number, the arrangement for grounding the odd level at point A requires only a make contact on the first relay, that for grounding the even level at point A requires a break on the same relay. If relay 2 is unoperated, the parity at point B will be the same as at point A regardless of the condition of relay 1, and conversely, if relay 2 is operated, the parity must be reversed in going from A to B. Accordingly, break contacts on relay 2 extend the odd and even levels unchanged from A to B while make contacts interchange the condition between these points. Since the number of relays operated must be either odd or even, it would suffice if only two relays were concerned to suppress one or the other of the levels at point B thus saving a transfer on relay 2; this gives the common circuit for controlling a light from two locations by use of two three-way switches. The basic circuit can be extended to 3, 4 or any greater number of relays by adding circuits on each relay identical with that shown between A and B. If this is terminated at point C, with suppression of one output level, it gives the circuits employed in K1, K2 and K3 of Fig. 1 for the 4-element binary code; if extended to point D, the circuit is that used at the receiving end in EI of Fig. 1. In any event the circuit will be recognized as that used for controlling a light from a multiplicity of locations, employing two three-way switches in connection with the required number of four-way switches. The receiving parity arrangement within EI of Fig. 1 must be changed so that there is a check relay coil for each check element required. Each coil is to be connected to an even parity arrangement of the circuit shown in Fig. 2 in accordance with the proper subgroups.

The three parity circuits within EI of Fig. 1 are interconnected to one another so as to present an economical use of relay contacts. For any particular code group requirements certain modifications of the basic circuit of Fig. 2 will be desirable in order that a minimum of relay contacts will be employed in the receiving parity circuits. To modify the contact arrangement within EL a relay tree should be constructed with at least one more output lead than the error-correcting code group has elements. There must be an error relay coil for each element position, and each of these coils is grounded by a particular relay tree output lead if an error occurs in the code group position it checks. The one remaining output lead is used to provide check ground in the case that all elements are received without error by the register relay coils. The circuits within ER and OUT need only be modified by increasing or decreasing the number of output relay coils and providing connections to ground by the corresponding error and register relay contacts.

The receiving circuit within EI and EL described in conjunction with Fig. 1 is slow in operation since it is necessary to energize the check relay coils C1, C2 and C3 so as to ground the check lead when no error has occurred. In some applications the delay in grounding the check lead before the appropriate output relay coils are energized is undesirable. A faster circuit is easily provided for by rearranging the circuit so that the check lead is grounded by contacts actuated by the register relays themselves. The parity check operation, however, must be carried out in detail to permit location of an error if one occurs. This arrangement will result in faster operation in the absence of error, with slowing down of circuit operation when an error must be located and corrected. Fig. 3 shows contact and coil arrangements in which IE replaces the arrangement within EI of Fig. 1 and LE replaces the arrangement with EL of Fig. 1. These circuit substitutions are the only ones necessary to speed up operation of the circuit of Fig. 1. The improved arrangement for obtaining check ground when no error is detected, and for operating check relays in presence of a single error, is provided by the contacts within IE. The requirement for check ground is, of course, that the check combinations of register relays (MR1, MR2, MR4, KR1), (MR1, MR3, MR4, KR2), and (MR2, MR3, MR4, KR3) must all represent operation of even numbers of relays. It is noted that the combination (MR1, MR2, MR4, KR1) will be even if the combination (MR1, MR2, MR3, MR4) and the combination (MR3, KR1) are both even, or both odd, and not otherwise. Combination (MR1, MR3, MR4, KR2) will be even if the combinations (MR1, MR2, MR3, MR4) and (MR2, KR2) are both even, or both odd, and not otherwise. Combination (MR2, MR3, MR4, KR3) will be even if the combinations (MR1, MR2, MR3, MR4) and (MR1, KR3) are both even, or both odd, and not otherwise. The characteristics of these basic combinations provide a method of economy in the relay contacts necessary to ground the check lead of Fig. 3 when all the basic parity subgroups are received in even parity. This is done in the circuit within IE by proceeding initially from ground 10 through a parity checking circuit using contacts operated by relay coils MR1, MR2, MR3 and MR4, obtaining both odd and even indications at the right-hand end of this portion of the circuit. The odd output of this network is then followed by paths in series which are closed only if (MR3, KR1), (MR2, KR2) and (MR1, KR3) are odd; similar even combinations are interposed between the even output of the first network and the check lead. Relay coils C1, C2 and C3 are operated whenever their respective corresponding check groups are determined to be odd; thus their indications are the reverse of those of the check relay coils C1, C2 and C3 of Fig. 1. C1 and C2 of Fig. 3 are operated through the basic parity network in series with combinations (MR3, KR1) and (MR2, KR2) as required. C3 is fed off the basic parity network at a convenient point thus effecting some saving of contacts. A ground applied elsewhere to the check lead cannot back up to operate any of check relays, since the circuit is in this respect disjunctive. The circuit within LE shows the rearrangement of EL of Fig. 1 to operate the error relays as a result of the change in function of the check relays. Again it is a relay tree, except that in this case no output is provided for the case in which all check relays are unoperated, since the parity circuit arrangement within IE provides this ground directly through the check lead. The circuits within ER and OUT of Fig. 1 would be used for locating an error and reversing the combination of the corresponding register as previously described.

Fig. 4 is a single error-correcting plus double error-detecting relay circuit arrangement employing eight-element code groups. The circuit arrangement in general is that of Fig. 1 with modifications to provide for the added detection feature. The circuit components of Fig. 4 accomplish electrically the functions and have the properties of the code described in Subsection Ic in conjunction with Table V. The operation of the components within INP is the same as that of Fig. 1. The register relay coil circuit within RR includes an additional check relay coil KR4. This relay coil is energized in accordance with the ground return path provided by particular contact arrangements within K4. K4 is an added sending parity check circuit which is necessary for the generation of the fourth check element for a single error-correcting plus double error-detecting code system. The value of the check element in element position $k_4$ of Table V was determined so as to form even parity with the 1 values in element positions $k_1$, $k_2$, $k_3$, $k_4$, $m_1$, $m_2$, $m_3$ and $m_4$ for a given code group. Analysis of Table V shows that the value in check element position $k_4$ also forms even parity with element values in element positions $m_1$, $m_2$ and $m_3$ for each of the code groups in Table V. This code property permits an economy in the use of contacts in the sending parity check circuit within K4. The requirement that KR4 be grounded, if an odd number of register relays MR1, MR2, MR3, MR4, KR1, KR2 and KR3 should be energized by a particular code group, is satisfied by grounding KR4 when an odd number of relays M1, M2 and M3 is energized. Thus the relay coils within RR convert non-error-correcting information code groups which operate any combinations of switches 1, 2, 3 and 4 into the single error-correcting plus double error-detection code groups of Table V.

The check relay coils C1, C2, C3 and C4 and the relay contacts within DEI perform receiving parity check circuit functions. If a particular code group was received by the register relay coils within RR without error, all of relay coils C1, C2, C3 and C4 would be grounded by their respective parity check circuits and they would be energized by current supplied by battery 7. If an error occurred in the reception of a code group one, two, three or all of relay coils C1, C2, C3 and C4 would not be energized. The element position in which this error occurred would be determined by the particular combination of energized relays. If a double error occurred, C4 would be energized and one, two, three or all of relay coils C1, C2 and C3 would not be energized. The detailed design of the receiving parity check circuits for check relay coils C1, C2, C3 and C4 is as follows: C1 should be energized if an even number of the relay combination (MR1, MR2, MR4, KR1) is energized. C2 should be energized if an even number of the relay combination (MR1, MR3, MR4, KR2) is energized. C3 should be energized if an even number of the relay combination (MR2, MR3, MR4, KR3) is energized. C4 should be energized if an even number of the relay combination (MR1, MR2, MR3, MR4, KR1, KR2, KR3, KR4) is energized. The detailed parity contact arrangement for check relay coils C2 and C3 is the same as for the relay coils C2 and C3 of Fig. 1. The parity circuit for C4 is shared by relay coil C1 so as to provide for an economy of relay contacts. C1 connects to an even parity level of a parity circuit involving relay contacts actuated by MR1, MR2, MR4 and KR1 as this point defines the condition for grounding relay coil C1. Both odd and even levels of this parity circuit are extended to relay coil C4 by contacts actuated by KR2, KR3, KR4 and MR3.

The contact arrangements within DEL provide for location of any single error registered by the register relay coils and indicated by the check relay coils. If a double error occurs, relay coil RO is grounded and make contacts *ro* will be closed. Said contacts *ro* can be connected to any type of alarm device or stop circuit as required in a particular application so that an operator can be warned that a double error has occurred. Error relay coils E1, E2, E3, E4, E5, E6, E7 and E8 are connected to the output of a relay tree formed from contacts actuated by check relay coils C1, C2, C3 and C4. The make and break relay contact assignments should be so arranged that with an error having been indicated by a particular unenergized combination of one, two, or all of check relay coils C1, C2 and C3, that the appropriate error relay coil will be grounded and thereby energized by battery 8. If no error is registered by the register relay coils, C1, C2, C3 and C4 will be grounded and energized thereby closing make contacts *c1*, *c2*, *c3* and *c4* within DEL and grounding the check lead. The circuit arrangements within ER and OUT operate similarly to the arrangements within ER and OUT of Fig. 1. With a single error the proper output relay coils within OUT will be grounded and thereby energized by battery 9. If a double error occurs in a given code group, the proper output relay coils for correction within OUT will not be energized; however, contacts *ro* will be closed operating the detection alarm not shown. This operation is determined by make contact *c4* in series with parallel break contacts *c1*, *c2* and *c3*. If C4 is energized and one, two, or all of C1, C2 and C3 are not energized, then RO is grounded. It can thus be seen that the relay circuit of Fig. 4 has the same code properties and characteristics outlined in conjunction with the code of Table V.

Relay circuits employing self-correcting means were chosen for the specification because they more clearly show the operation of error-correcting codes and multiple error-detecting and correcting codes than other type of circuits. It is apparent, however, that the structural functions necessary to accomplish self-correction can be accomplished without invention by the use of vacuum, gas and beam guide tube circuits or other electrical and electronic devices. In a mechanical system, mechanical arrangements can also be devised following the principles of the electrical circuits disclosed herein. In general, any system would employ error-correction or multiple error-detection and correction codes in which the minimum distance between the information code groups is that listed in Table VII. The code groups used can be of any length provided the minimum distance requirement between information code groups is adhered to. Any permutation scheme known in the mathematical art can be used for element value assignment so as to maintain the proper distance for the length of code groups chosen. This specification disclosed a parity check method in subsection I*b* and I*c* for converting non-error-correcting code groups into error-correcting code groups by forming new code groups which have the proper minimum distance. This method is advantageous when the code groups to be converted have less than the minimum distance. In certain instances it might be desirable to transmit or employ properly distanced code groups initially without the addition of check elements. In such a case transmitting parity check methods can be dispensed with and proper distance code groups can be transmitted. Having transmitted proper distance code groups, whether check elements are added or not, if the system errors are limited to that permitted by Table VII for the distance chosen, any comparison method at a subsequent system point which compares the code groups received with those which constitute the information code groups of the code, will locate and detect the error positions. Error correction after location is simply a reversal of values. This is the basic principle upon which this invention operates and so far as it is known this principle has never been recognized or employed structurally in the prior art. The comparison method chosen in this specification was the reception parity check, because it was analogous to the sending or transmitting parity check used for adding check elements. The binary codes used were structurally represented by relay circuits in which the two possible values of each code group element were characterized by on-off signaling conditions. It should be understood, however, that self-correcting codes are applicable to the dual signaling conditions attainable by dot and dash, perforated tape, cards with holes and non-holes, plus and minus pulse methods or any other scheme for distinguishing one from the other of two signaling conditions. For illustrative purposes the circuits described also assume parallel transmission of code elements over multiwire leads from the sending to receiving stages; it is understood, however, that the same code methods disclosed will, by the use of distributors as in start-stop telegraphy, permit the fundamental arrangements described to be used for sequential transmission of the code elements of each code group, nor is it necessary to use register relays or their equivalent in the operation of an error-correcting system. It is possible to transmit the code groups through delay lines or delay networks while the parity of code element subgroups is being checked by suitable circuits, the time delay being of sufficient duration that a code group does not appear at the output of the delay arrangement until a possible error is located by the parity procedure. At the output of the delay arrangement any erroneous values indicated by the receiving parity checks could be reversed as to signaling condition. Thus the hereinbefore described arrangements are only illustrative of the application of the principles of this invention and numerous other arrangements may be devised by those skilled in the art without departing from the spirit and scope of this invention.

What is claimed is:

1. In an information system employing equal length permutation code groups in which element values are characterized by one or the other of two possible signaling conditions, the improvement which comprises means for encoding information into single error-correcting code groups in which each of said single error-correcting code groups has element values differing from the element values of each of the other of said single error-correcting code groups in three or more element positions in a respective element position comparison of each of said single error-correcting code groups, and means for changing the value in any one of the element positions of each of said single error-correcting code groups so that the said element value difference created by said encoding means is maintained if no more than a single element error occurs in each of said single error-correcting code groups.

2. In an information system employing equal length permutation code groups in which element values are characterized by one or the other of two possible signaling conditions, the improvement which comprises means for encoding information into single error-correcting plus double error-detecting code groups in which each of said single error-correcting plus double error-detecting code groups has element values differing from the element values of each of the other of said single error-correcting plus double error-detecting code groups in four or more element positions in a respective element position comparison of each of said single error-correcting plus double error-detecting code groups, means for changing the value in any one of the element positions of each of said single error-correcting plus double error-detecting code groups so that the said element value difference created by the said encoding means is maintained if no more than a single element error occurs in each of said single error-correcting plus double error-detecting code groups, and means for detecting two or less possible element value errors in each of said single error-correcting plus double error-detecting code groups.

3. A digital information system comprising means for encoding information into permutation code groups constructed from elements having element values characterized electrically by one or the other of two possible signaling conditions, means for adding elements having element values also characterized electrically by one or the other of two possible signaling conditions to each of said permutation code groups so that an error-correcting code is formed whereby each new code group has a minimum geometrical distance of at least three units from each of the other of said new code groups forming the said error-correcting code, means for receiving said error-correcting code group, means for detecting in each of said error-correcting code group received by said receiving means one erroneous element value signaling condition, means for locating as to element position the element value erroneously received by said receiving means, means for reversing the signaling condition erroneously received by said receiving means, and output information means.

4. A digital information system comprising means for transmitting permutation code groups constructed with a geometrical spacing of three units and having element values characterized electrically by one or the other of two possible signaling conditions, reception means for receiving said transmitted code groups, and means for reversing a signaling condition erroneously received by said reception means before further transmission of the said code groups to an output stage.

5. A digital information system comprising means for encoding information into a multiple error-detecting plus single error-correcting permutation code constructed from code groups having a geometrical distance of at least four units between each of said code groups forming said multiple error-detecting plus single error-correcting code, and means for detecting one or more errors in each of said multiple error-detecting plus single error-correcting code groups, and means for correcting a single error in each of said multiple error-detecting plus single error-correcting permutation code groups if only a single error occurs.

6. An information system comprising means subject to erroneous operation and employing information encoded into a permutation code constructed from code groups having a minimum geometrical distance of at least three units and having code group element values characterized by one or the other of two possible signaling conditions, means for comparing each permutation code group received from said first means with each and every correct permutation code group that can be received from said first means, and means for correcting one error in each of said permutation code groups received from said first means with only one error.

7. An information system comprising means subject to erroneous operation and employing information encoded into a permutation code constructed from code groups having a minimum geometrical distance of at least four units and having code group element values characterized by one or the other of two possible signaling conditions, means for comparing each permutation code group received from said first means with each and every correct permutation code group that can be received from said first means, means for correcting one error in each of said permutation code groups received from said first means with only one error, and means for detecting one or more errors in each of said permutation code groups received from said first means with one or more errors.

8. A digital information system comprising means for encoding information into permutation code groups which permit any single error in each of said code groups to be automatically located, means employing said permutation code groups, means for detecting one or more errors in each of said code groups employed in said second means, means for locating as to element position a single error in each of said code groups employed in said second means, means for correcting a single error in each of said code groups employed in said second means.

9. A digital information system using equal length codes comprising means for encoding information into a code having a redundancy greater than one and having code group element values characterized by one or the other of two signaling conditions, means employing said code, means for detecting one or more errors in each code group of said code employed in said second means, means for locating as to element position one or more errors in each of said code groups employed in said second means, and means for correcting one or more errors in each of said code groups employed in said second means.

10. An information system comprising means for encoding information into a single error-correcting code having a maximum of $2^m$ different useful $n$ element length information code groups and having a code redundancy of greater than or equal to $n/m$, means employing said single error-correcting code, means for detecting a single error in each of said single error-correcting code groups employed in said second means, means for locating as to element position a single error in each of said single error-correcting code groups employed in said second means, and means for changing the values in the erroneous element value positions located by said fourth means.

11. A digital information system comprising means employing $2^m$ different $n=m+k$ element length triple unit geometrical distance permutation code groups having element values characterized by one or the other of two possible signaling conditions, each of said $n$-element length permutation code symbols having $m$ information elements and $k$ check elements where $2^k \geqq n+1$, means for detecting the presence of permutation code groups in said first means not having the same permutation as any one of the said $2^m$ triple unit geometrical distance permutation code groups due to a single error, and means for correcting the said permutation code groups detected by said second means.

12. A digital information system comprising means employing permutation code groups having a plurality of selected element value parity subgroups for each of said code groups with each element in each of said code groups being in at least one of said parity subgroups and with no two different elements in each of said code groups being in the same set of parity subgroups, means for detecting one or more parity check subgroup failures in each of said code groups, means for identifying the said detected one or more parity check subgroup failures with a particular element position, and means for reversing the element value in the said identified element position.

13. A digital information system comprising means employing permutation code groups having a plurality of selected element parity subgroups for each of said code groups with each element of each of said code groups being in at least one of said parity subgroups and with no two different elements in each of said code groups being in the same set of parity subgroups, and means for detecting one or more parity check subgroup failures in each of said code groups.

14. A digital information system employing permutation code groups n-elements in length having $k$ parity subgroups for each of said code groups where $2^k \geqq n+1$ and each of said $k$ parity subgroups involving a different combination of code group elements, and means for detecting parity check failure in each of said $k$ parity subgroups.

15. An information system comprising a source of information, means for encoding the information from said source into digital code groups having element values characterized by one or the other of two possible signaling conditions, means for adding to each of said code groups elements having element values so determined as to form even or odd parity with the element values in unique code group parity check subgroups, means for detecting a change in parity in any of said parity check subgroups, means for correcting any change in parity in said parity check subgroups detected by said detecting means.

16. An information system comprising means employing digital permutation code groups having code group element values so determined as to form even or odd parity in accordance with unique error-correcting code group parity check subgroups, means for detecting a change in parity in any of said parity check subgroups, and means for correcting any change in parity in said error-correcting code group parity check subgroups detected by said detecting means.

17. An information system comprising a source of information, means for encoding said information into digital permutation code signaling conditions, a set of information relays operated in accordance with said digital permutation code signaling conditions, a set of sending parity check relay contact circuits having relay contacts actuated by said set of information relays, a set of information element register relays operated by said set of information relays, a set of check element register relays connected to said set of sending parity check relay contact circuits, a set of receiving parity check relay contact circuits having relay contacts actuated by said information element and said check element register relays, a set of check relays connected to said set of receiving parity check relay contact circuits, a relay contact tree circuit having relay contacts actuated by said set of check relays, a set of error relays connected to the output leads of said relay contact tree circuit, and a set of output relays connected to error reversal relay contact circuits having relay contacts actuated by said sets of error, and information element register and check element register relays.

18. An information system comprising a source of information, means for encoding said information into digital permutation code signaling conditions, a set of information relays operated in accordance with said digital permutation code signaling conditions, a set of sending parity check relay contact circuits having relay contacts actuated by said set of information relays, a set of information element register relays operated by said set of information relays, a set of check element register relays connected to said set of sending parity check relay contact circuits, a set of receiving parity check relay contact circuits having relay contacts actuated by said information element and said check element register relays, a set of check relays connected to said set of receiving parity check relay contact circuits, a relay contact tree circuit having relay contacts actuated by said set of check relays, a set of error relays connected to a plurality of the output leads of said relay contact tree circuit, an error-detecting alarm connected to one of the output leads of said relay contact tree circuit, and a set of output relays connected to error reversal relay contact circuits having relay contacts actuated by said sets of error, information element register and check element register relays.

19. The method of detecting, locating, and correcting errors in the encoded information of a digital system which comprises, first, encoding information into permutation code groups wherein all code group elements are in parity arrangement with a unique set of code subgroups, second, transmitting the encoded code groups, third, checking each of said code subgroups as received for a change in parity, fourth, identifying said subgroup parity changes with a particular element position, and fifth, reversing the signaling condition of an element identified by said fourth step.

20. The method of detecting, locating, and correcting errors in information encoded into a permutation code which comprises, first, encoding said information into code groups in which each of said code groups has element values differing from the element values of each of the other of said code groups in a plurality of three or more element positions in a respective element position comparison of each of code groups, and second, changing the value in any one of the element positions of each of said code groups so that said element value difference created in said first step is maintained.

RICHARD W. HAMMING.
BERNARD D. HOLBROOK.

REFERENCES CITED

The following references are of record in the file of this patent:

UNITED STATES PATENTS

| Number | Name | Date |
|---|---|---|
| 2,512,038 | Potts | June 23, 1950 |
| 2,520,142 | Herbst | Aug. 29, 1950 |